C. J. PAINE.
Wheel Cultivator.

No. 83,537.

Patented Oct. 27, 1868.

CLINTON J. PAINE, OF YOUNG AMERICA, ASSIGNOR TO HIMSELF AND HENRY CRES-WELL, OF WARREN COUNTY, ILLINOIS.

Letters Patent No. 83,537, dated October 27, 1868.

IMPROVEMENT IN CORN-PLOWS.

The Schedule referred to in these Letters Patent and making part of the same.

*To all whom it may concern:*

Be it known that I, CLINTON J. PAINE, of Young America, in the county of Warren, and in the State of Illinois, have invented certain new and useful Improvements in Corn-Plows; and do hereby declare that the following is a full, clear, and exact description thereof, reference being had to the accompanying drawings, and to the letters of reference marked thereon.

The nature of my invention consists—

First, in a curved or crooked draught-bar, running from the inside of the centre of the wheel, forward and upward, across the top, and down to the centre of the other wheel.

Second, in crooked or curved plow-beams, when coupled to a crooked or curved draught-bar, forward of the centre of the wheels, thereby removing all neck-draught, and allowing the plows to move outside of the wheels.

Third, in placing the double-trees back of and over the point of the plow-beams, thereby giving lightness of draught to the plows.

Fourth, in placing a bar back of the draught-bar, and running across the top, down outside of the wheels, for the purpose of gaining a bearing outside of and giving steadiness to the wheels.

Fifth, in the peculiar device for coupling the plow-beams to the curved draught-bar.

In order to enable others skilled in the art to make and use my invention, I will now proceed to describe its construction and operation, referring to the annexed drawings, which form a part of this specification, and in which—

Figure 1:
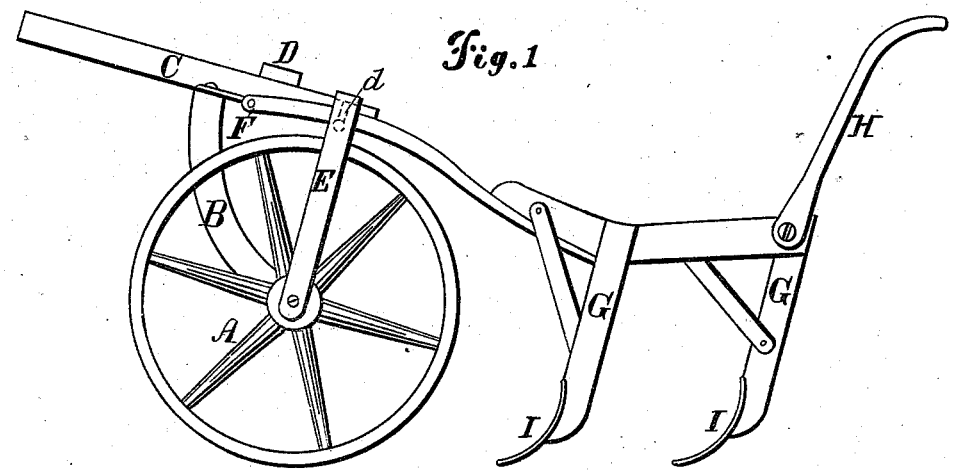

Figure 1 is a side view, and

Figure 2:
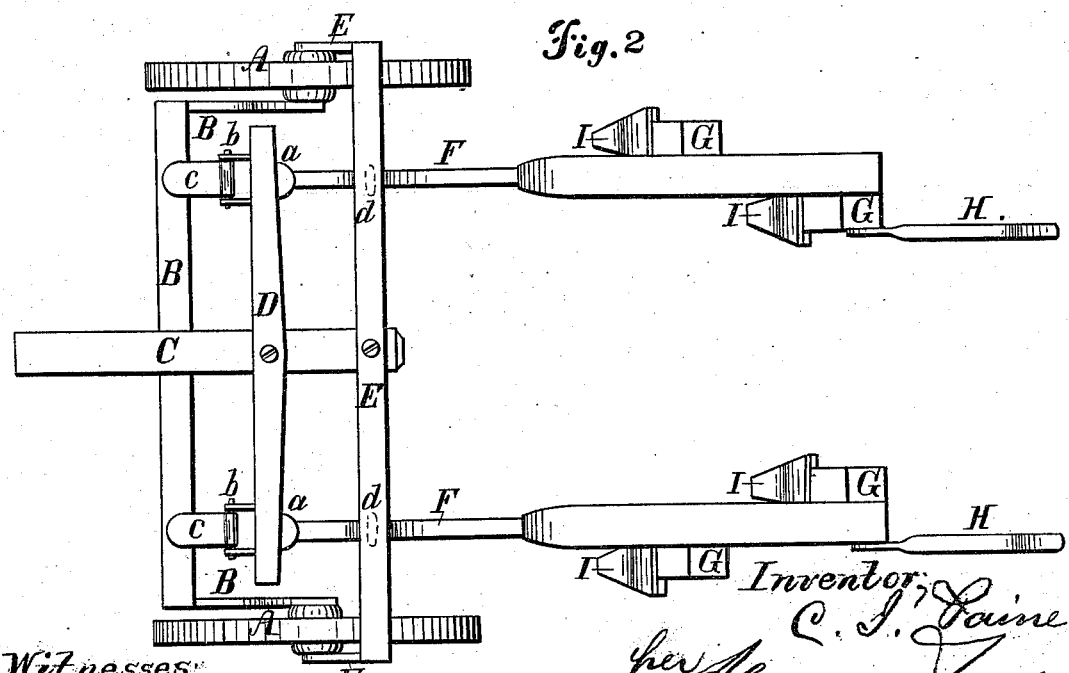

Figure 2, a plan view.

A represents the wheels, from the centre of which, and on the inner side thereof, a curved or crooked draught-bar, B, extends forward and upward, and across the top, as shown in fig. 2.

C is the tongue, which is secured on the top of the draught-bar B, and extends backwards so far that its rear end is secured on its top side to a bar, E, which extends across the top of the wheels, and down on the outside, and fastened to the centre of the wheels, so that by this bar a bearing is gained on the outside, and steadiness is given to the wheels.

The double-tree D is pivoted on the tongue C, back of the draught-bar, and over the points of the plow-beams F F, thereby shortening the draught.

The curved or crooked plow-beams F F are coupled to the draught-bar B in the following manner: The points *a a* of the beams are forked, with a pin, *b*, passing through, so that the pin forms a hinge with the plate *c*, which is pivoted on the draught-bar B, and bent around the pin *b*, by which arrangement the plows can be moved to either side, as may be desired.

On the lower side of the bar E are two hooks, *d d*, which serve to suspend the plow-beams, when moving the machine from one field to another.

G G represent the arms of the plow-beams, to which the plows I I are fastened, and H H are the handles of the plows.

Having thus fully described my invention,

What I claim as new, and desire to secure by Letters Patent, is—

1. The curved draught-bar B, running from the inside of the centre of the wheels forward and upward, substantially as and for the purposes herein set forth.

2. The arrangement of the curved plow-beams F F, coupled to the curved draught-bar B, as and for the purposes herein set forth.

3. The bar E, running from the outside of the centre of the wheels, and across the top, as and for the purposes herein set forth.

4. The combination of the forked ends *a a* of the plow-beams, and the pins *b b*, and plates *c c*, forming a hinged coupling, substantially as and for the purposes herein set forth.

In testimony that I claim the foregoing, I have hereunto set my hand, this 11th day of May, 1868.

CLINTON J. PAINE.

Witnesses:
J. H. MARTIN,
WM. M. GALBRAITH.